US007603286B2

United States Patent
Ouimet

(10) Patent No.: US 7,603,286 B2
(45) Date of Patent: Oct. 13, 2009

(54) DEMAND-MODEL BASED PRICE IMAGE CALCULATION METHOD AND COMPUTER PROGRAM THEREFOR

(75) Inventor: Kenneth J. Ouimet, Scottsdale, AZ (US)

(73) Assignee: SAP AG, Walldorf (DE)

(*) Notice: Subject to any disclaimer, the term of this patent is extended or adjusted under 35 U.S.C. 154(b) by 1250 days.

(21) Appl. No.: 10/637,991

(22) Filed: Aug. 7, 2003

(65) Prior Publication Data

US 2004/0049470 A1  Mar. 11, 2004

Related U.S. Application Data

(63) Continuation-in-part of application No. 09/951,334, filed on Sep. 10, 2001, now Pat. No. 6,988,076, which is a continuation-in-part of application No. 09/084,156, filed on May 21, 1998, now Pat. No. 6,308,162.

(60) Provisional application No. 60/459,934, filed on Apr. 3, 2003.

(51) Int. Cl.
  G06F 17/30  (2006.01)
(52) U.S. Cl. ...................................................... 705/10
(58) Field of Classification Search .................... 705/10
  See application file for complete search history.

(56) References Cited

U.S. PATENT DOCUMENTS

| 5,377,095 | A  | 12/1994 | Maeda et al.   |
|-----------|----|---------|----------------|
| 5,521,814 | A  | 5/1996  | Teran et al.   |
| 5,630,070 | A  | 5/1997  | Dietrich et al.|
| 5,873,069 | A  | 2/1999  | Reuhl et al.   |
| 5,946,662 | A  | 8/1999  | Ettl et al.    |
| 5,953,707 | A  | 9/1999  | Huang et al.   |
| 6,078,893 | A  | 6/2000  | Ouimet et al.  |
| 6,094,641 | A  | 7/2000  | Ouimet et al.  |
| 6,308,162 | B1 | 10/2001 | Ouimet et al.  |
| 6,366,890 | B1 | 4/2002  | Usrey          |
| 6,415,263 | B1 | 7/2002  | Doss           |
| 2002/0065699 | A1 | 5/2002 | Talluri       |
| 2002/0107819 | A1 | 8/2002 | Ouimet        |
| 2002/0165834 | A1 | 11/2002 | Delurgio et al. |

OTHER PUBLICATIONS

Russell "A Price Vector Model of Demand for Consumer Durables: Preliminary Developments", Dec. 1985, Marketing Science, vol. 4, No. 1. pp. 74-90.*

(Continued)

*Primary Examiner*—Romain Jeanty
(74) *Attorney, Agent, or Firm*—Meschkow & Gresham, PLC

(57) ABSTRACT

A demand control process (42) includes a price-image computation subprocess (44) and an optimization subprocess (46). The price-image computation subprocess (44) tunes a demand model to both price (76) and non-price (78) demand-parameters. Baseline and trial pricing scenarios (98, 114) are then compiled for a selected set (86) of products and operated upon by the demand model to forecast demand (110, 118) at the specified prices. Revenues (122) are calculated at the baseline pricing scenario (98) using the forecast demand (110), and the revenues (122) are used to calculate weights for compiling summary statistics over the set (86) of products. Price image is then calculated using the values forecast by the demand model so that the resulting price image is responsive to price and non-price demand parameters (76, 78).

34 Claims, 4 Drawing Sheets

OTHER PUBLICATIONS

Russell S. Winer (A Reference Price Model of Brand Choice for Frequently Purchased Products) The Journal of Consumer Research, vol. 13, No. 2. (Sep. 1986), pp. 250-256.*

Alan (Creating Micro/Marketing Pricing Strategies Using Supermarket Scanner data), Nov. 1997, Marketing Science, pp. 315-337.*

Stephen et al (Determinants of Store-Level Price Elasticity), Feb. 1995, Journal of Marketing Research, pp. 17-29.*

Doherty "Forecasting the effect of price changes on net revenue across different market segments", Jan. 1997, Journal of Business Forecasting Methods & Systems v15n4 pp. 7-10, Dialog file 15, Accession No. 01386942.*

Russell (A Price Vector Model of Demand for Consumer Durables: Preliminary Developments, Dec. 1985, Marketing Science, vol. 4, No. 1. pp. 74-90.*

Anthony et al (Competing on price: the role of retail price advertisements in shaping store-price image), Dec. 1990, ournal of retailing, v66, n4, pp. 1-12.*

Winter "A Price Vector Model of Demand for Consumer Durable: Preliminary Developments", Dec. 1985, Marketing Science vol. 4. No. 1, pp. 74-90.*

Dickson & Sawyer, The Price Knowledge and Search of Supermarket Shoppers, Journal of Marketing, vol. 54. Jul. 1990, pp. 42-53.

Cox & Cox, Competing on Price: The Role of Retail Price Advertisements in Shaping Store-Price Image, Journal of Retailing, vol. 66 No. 4 Winter 1990.

Allenby & Lenk, Reassessing Brand Loyalty, price Sensitivity, and Merchandising Effects on Consumer brand Choice, Journal of Business & Economic Statistics, Jul. 1995, vol. 13, No. 3.

Bolton, The Robustness of Retail-Level Price Elasticity Estimates, Journal of Retailing, vol. 65, No. 2 Summer 89.

Pedraja Iglesias, The Components of Total Perceived Price: An Empirical Analysis in Restaurant Services, Published 2002.

Poh & Jasic, Forecasting and Analysis of Marketing Data Using Neural Networks: A Case of Advertising and Promoting Impact, Published Feb. 20, 1995.

Bateman & Munro, A Test of the Theory of Reference-Dependent Preferences, Quarterly Jounral of Economics, May 1997, vol. 112, Issue 2, p. 479.

* cited by examiner

| 52 | 76 | 68 | 78 | 98 | 104 | 122 | 110 | 125 |
|---|---|---|---|---|---|---|---|---|
| INDEX:ID | ACTUAL PRICE | NON-PRICE PARAM'S | BASELINE PRICE | PRICE ELASTICITY | REVENUE | BASELINE DEMAND | WEIGHT |
| 1 : 3 | 2.29 | -- | 2.15 | -- | -- | -- | -- |
| 2 : 4 | -- | -- | -- | -- | -- | -- | -- |
| 3 : 10,544 | 2.29 | -- | 3.435 | -- | -- | -- | -- |
| 4 : 32,239 | -- | -- | -- | -- | -- | -- | -- |
| ••• | ••• | ••• | ••• | ••• | ••• | ••• | ••• |
| M : 946,975 | -- | -- | -- | -- | -- | -- | -- |

94 ⎫ 86 ⎭

| 52 | 114 | 118 | 127 |
|---|---|---|---|
| INDEX:ID | TRIAL PRICE | TRIAL DEMAND | DEMAND CHANGE |
| 1 : 3 | 1.99 | -- | -- |
| 2 : 4 | -- | -- | -- |
| 3 : 10,544 | 3.435 | -- | -- |
| 4 : 32,239 | -- | -- | -- |
| ••• | ••• | ••• | ••• |
| M : 946,975 | -- | -- | -- |

86

US 7,603,286 B2

DEMAND-MODEL BASED PRICE IMAGE CALCULATION METHOD AND COMPUTER PROGRAM THEREFOR

RELATED INVENTIONS

The present invention claims priority under 35 U.S.C. §119(e) to: "A Method for Calculation of a Price Image," U.S. Provisional Patent Application Ser. No. 60/459,934, filed 3 Apr. 2003, which is incorporated by reference herein.

The present invention is a Continuation-In-Part of: "Strategic Planning And Optimization System," Ser. No. 09/951,334, filed 10 Sep. 2001, now U.S. Pat. No. 6,988,076 which is a Continuation-In-Part of: "Method For Controlled Optimization Of Enterprise Planning Models Ser. No. 09/084,156," filed 21 May 1998, now U.S. Pat. No. 6,308,162, both of which are incorporated by reference herein.

TECHNICAL FIELD OF THE INVENTION

The present invention relates generally to the field of econometrics. More specifically, the present invention relates to processes and systems for mathematically modeling and controlling strategic objectives in enterprise planning models.

BACKGROUND OF THE INVENTION

Price image is a useful parameter when mathematically modeling an enterprise. Price image generally refers to the perceptions of customers about the prices of products offered by one enterprise as compared to perceptions about the prices of competing enterprises. Discount retailers typically cultivate a low price image while more "high end" or exclusive retailers cultivate a higher price image. Managers usually wish to provide an entire purchasing experience for their customers consistent with the price image. Thus, discount retailers need not undergo the costs of providing extraordinary services or of lavish shopping surroundings, but more high end retailers had better provide such things or risk their customers being disappointed by their shopping experiences.

The above-discussed U.S. Pat. No. 6,308,162 describes how price image may be used as a strategic objective or constraint in an enterprise model to help pricing managers price products. In one common use, an enterprise model may suggest prices for a set of products so that profits are maximized while price image remains constant. This may be accomplished by adjusting the prices of some products upward while adjusting the prices of other products downward. In another use, an enterprise model may suggest prices for a set of products to maintain profitability while lowering price image. Such a strategy may lead to greater market share in the short term and pave the way to greater profitability long term.

A need exists of a frugal, yet accurate process to quantize price image for use with an enterprise optimization model and for other purposes. But such a process has been difficult to realize. The above-discussed U.S. Pat. No. 6,308,162 teaches the use of a price index as a proxy for price image, as follows:

$$\text{Price Image} = \text{Price Index} = \frac{1}{N} \sum_{i=1}^{N} \frac{P_i}{\overline{P}_i} * w_i, \quad (1)$$

where $\overline{P}_i$ is the average price of item i in the market of interest, $w_i$ is a weighting function for item i, and N is the total number of items in the model. Unfortunately, the price index as a proxy for price image leads to an unfrugal process and produces a result that is not as accurate as desired.

The price index proxy for a price image is unfrugal because it requires obtaining prices for each item of interest in the market of interest so that average prices may be calculated. Obtaining such price data is extremely expensive. Often, an enterprise simply cannot get corresponding competitive pricing data because competitors do not offer this data to their competitors and different competitors may bundle or use entirely different pricing schemes. Even when competitive corresponding price data is obtainable, such data are so expensive to obtain that only a small amount is collected. But only a small amount of competitive price data often makes no significant contribution in a comprehensive enterprise model.

The price index is less accurate as a proxy for price image than desired because it assumes that consumers perceive prices to be as they actually are. While actual pricing is a strong influence on consumers perceptions about price, other non-price factors also influence perceptions. For example, promotional effects or a price threshold effect may cause two competing products actually priced nearly the same to be perceived as being priced very differently. While the non-price influence on perception may seem slight when applied to an isolated product, price image is often applied over a number of products where the individual prices of individual products are less distinctly perceived by customers. For price images that characterize an aggregation of products, the non-price influence on perception becomes more significant. Accordingly, the inability of the price index to capture non-price influences causes it to be inaccurate as a proxy for price image, regardless of the costs involved in obtaining price index data.

SUMMARY OF THE INVENTION

It is an advantage of the present invention that an improved price image calculation method and computer program are provided.

Another advantage of the present invention is that price image calculations are based on forecasts from a demand model which is tuned to price and non-price input parameters.

These and other advantages of the present invention are achieved in one form by a method of computing a price image for a set of products of an enterprise. The method calls for processing historical data describing activity of the enterprise to identify price and non-price factors of a demand model. The identification of price and non-price demand model factors tunes the demand model to the historical data so that the demand model can forecast demand from price-and non-price input parameters. Weighting factors are calculated for each product in said set of products. The weighting factors are based upon at least a portion of the demand factors identified in the activity where historical data were processed. The price image is computed for the set of products to be responsive to the weighting factors.

BRIEF DESCRIPTION OF THE DRAWINGS

A more complete understanding of the present invention may be derived by referring to the detailed description and claims when considered in connection with the Figures, wherein like reference numbers, refer to similar items throughout the Figures, and:

DETAILED DESCRIPTION OF THE PREFERRED EMBODIMENTS

The preferred embodiments of the present invention provide a useful tool for helping managers of an enterprise control or understand demand for the products offered by the enterprise. In the present context, an enterprise may be any public, private, or governmental organization that provides products to be consumed by others, whether or not for profit. Nothing prevents an enterprise from being only a part of a larger enterprise. Presumably, the enterprise competes with other enterprises for the attention of customers and potential customers. The products provided by an enterprise may be in the form of goods, services, or a combination of goods and services. Products are broadly defined so that the same good and/or service provided in different market segments may be considered different products within the present context. Moreover, products are considered to be consumed within the present context when physically and/or legally transferred to the customer, such as when a transaction occurs.

Those skilled in the art will appreciate that managers of an enterprise desire to understand and/or control the demand for the products offered by the enterprise. Managers typically do not wish merely to maximize volume, which can easily be accomplished by reducing the prices of its products below cost. Maximizing profit is often a desirable goal, but not always. Profits may be maximized by controlling demand for products through the establishment of appropriate prices for the products and engaging in non-price-related activities so that net revenues from selling all the products at the established prices are maximized. Another desirable goal at times is to maximize market share. In other words, demand for the products offered by the enterprise is maximized but usually within the constraint that profits not fall below some threshold.

The computation of a price image for an enterprise is a useful component in understanding and controlling demand for the products offered by the enterprise. As used herein, the term demand is used in its broadest sense. Demand simply refers to the desire to purchase products, coupled with the power to do so, and to the quantity of goods that potential customers will purchase at various prices. Demand may be expressed using a variety of metrics, including unit sales, dollar sales, and the like. Many enterprises, including retailers, collect voluminous amounts of data when transactions take place where products are transferred to customers. Often, such data are collected automatically at point-of-sale terminals or other computerized transaction points. Over time, this data may be collected in a historical data base and processed or mined in order to compute price image and to control demand for the products of an enterprise in response to the computed price image. This processing may take place in a computing environment.

Figure 1:
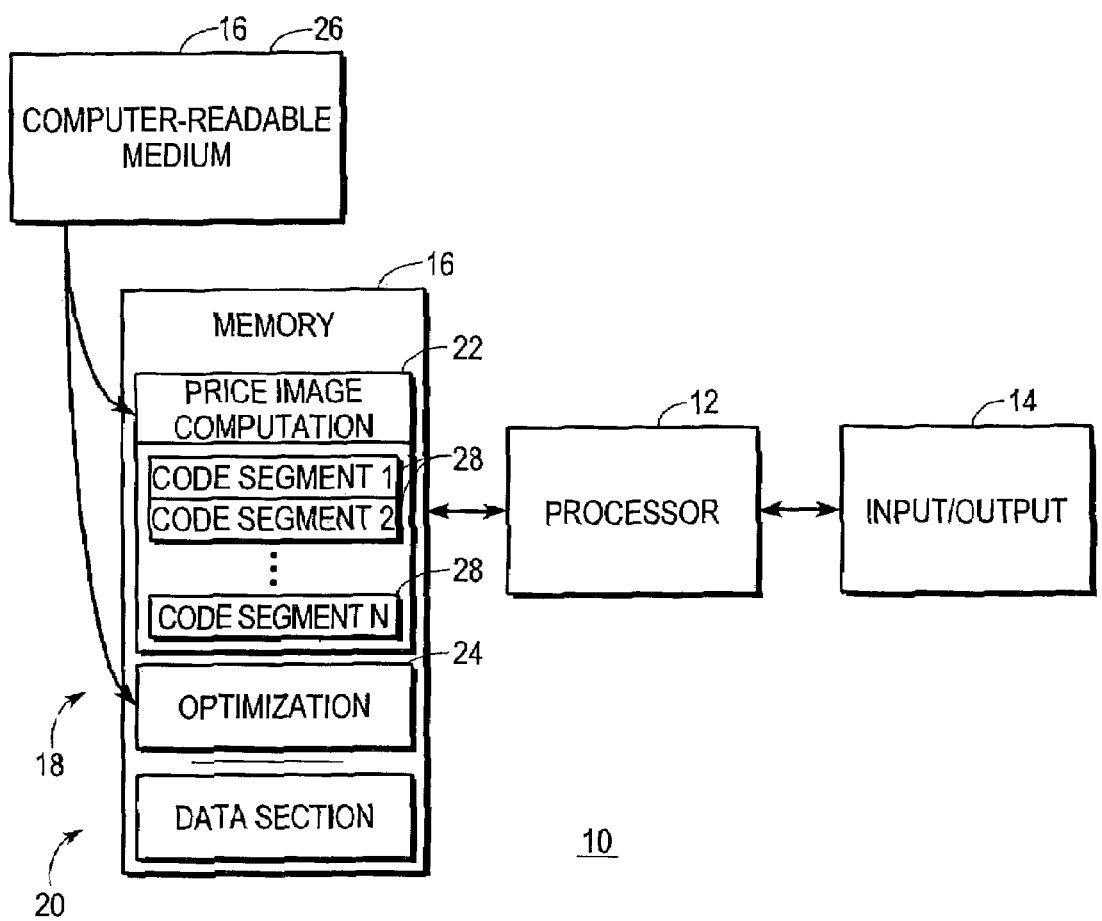
FIG. 1 shows a block diagram of a computing environment within which the method of the present invention may be practiced.

FIG. 1 shows a block diagram of an exemplary computing environment 10 within which the method of the present invention may be practiced. FIG. 1 depicts a processor section 12 in communication with an input/output section 14 and a memory 16. Nothing prevents processor section 12, input/output section 14 and/or memory 16 from including numerous subsections that may or may not be located near each other. Thus, computing environment 10 may be provided by any of a vast number of general or special purpose computers and/or computer networks. Memory 16 represents any manner of computer-readable media, including both primary memory (e.g., semiconductor devices with higher data transfer rates) and secondary memory (e.g., semiconductor, magnetic, and/or optical storage devices with lower data transfer rates).

Memory 16 is depicted as having a code section 18 and a data section 20. Those skilled in the art will appreciate that any distinction between sections 18 and 20 may be due merely to different types of data and need not be due to physically different types of memory devices. Code section 18 stores any number of the types of computer programs typically found on computers and/or computer networks. In addition, code section 18 includes a price image computation computer program 22 and an optimization computer program 24. Prior to being transferred to memory 16, computer programs 22 or 24 may have resided on a computer-readable medium 26. Computer-readable medium 26 represents any location or storage device from which computer programs may be accessed, including remote servers, CD ROMs, and the like. Each of computer programs 22 and 24 may be partitioned into a number of code segments 28. Computer programs 22 and 24, and code segments 28 thereof, provide computer software that instructs processor section 12 how to manipulate and process the data which are primarily maintained in data section 20. Historical data describing an enterprise's past transactions are one type of data that may reside in data section 20. In a typical application, a large or even a very large number of different products may be described by the historical data. Data and computer programs may be transferred in to or out from memory 16 through input/output section 14.

Figure 2:
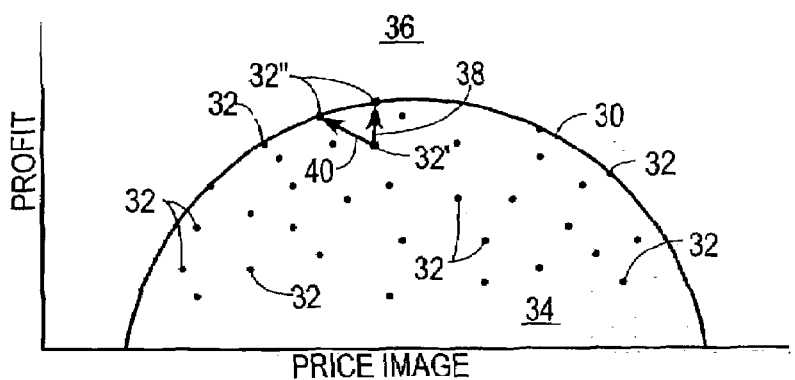
FIG. 2 shows a graphic representation of an optimum pricing envelope displaying profit versus price image.

FIG. 2 shows a graphic representation of an optimum pricing envelope 30 displaying profit versus price image. For this discussion, price image may be thought of as an aggregate of prices over many different products, but those skilled in the art will appreciate that nothing requires price image to be calculated for an aggregation of products and that price image may be calculated for a single product. FIG. 2 indicates that, starting from a very low price image, profits may increase as the aggregate of prices increases. However, at some point, further increase in the aggregate of prices causes a drop in profit as customers go elsewhere for their needs, and sales drop. As will be discussed in more detail below, a more accurate view of price image incorporates non-price parameters so that the price image aggregate statistic more precisely reflects the customers' perceptions of aggregate pricing. The incorporation of non-price parameters leads to improved accuracy because the customers' perceptions of pricing are better predictors of their purchase decisions than actual pricing.

FIG. 2 illustrates how price image may be used in a desirable way to control demand for products. When the enterprise offers many different products, a vast number of combinations of different pricing scenarios may be devised. Each pricing scenario represents a different mix of prices that may be offered for a set of products being evaluated, and each scenario is represented by a point 32 in FIG. 2. Of course, FIG. 2 depicts only a few of all possible pricing scenario points 32. Other than envelope 30, there are two regions of interest in the graph of FIG. 2. In a region 34 which resides within or underneath envelope 30 inefficient pricing is depicted. In inefficient-pricing region 34 a different mix of prices will achieve the same price image with greater profits. Alternatively, in inefficient-pricing region 34 still other mixes of prices will achieve the same profit but at a greater or lower price image.

Pricing scenario points are unachievable in a region 36, which resides outside envelope 30. Only on envelope 30 are optimum pricing scenarios obtained. Accordingly, a manager may use price image to move the enterprise from a pricing scenario 32 in inefficient-pricing region 34 (e.g., pricing scenario 32') to another pricing scenario 32 that is on envelope 30 (e.g., one of pricing scenarios 32"). As depicted by line 38, profitability may be increased in some situations without substantially changing an enterprise's price image. As depicted by a line 40, in some situations profitability may increase while actually lowering price image. Price image may be lowered or raised by altering either actual prices charged for products or by changing non-price parameters. Non-price parameters include promotional price effects, price threshold effects, availability effects, and the like.

Figure 3:
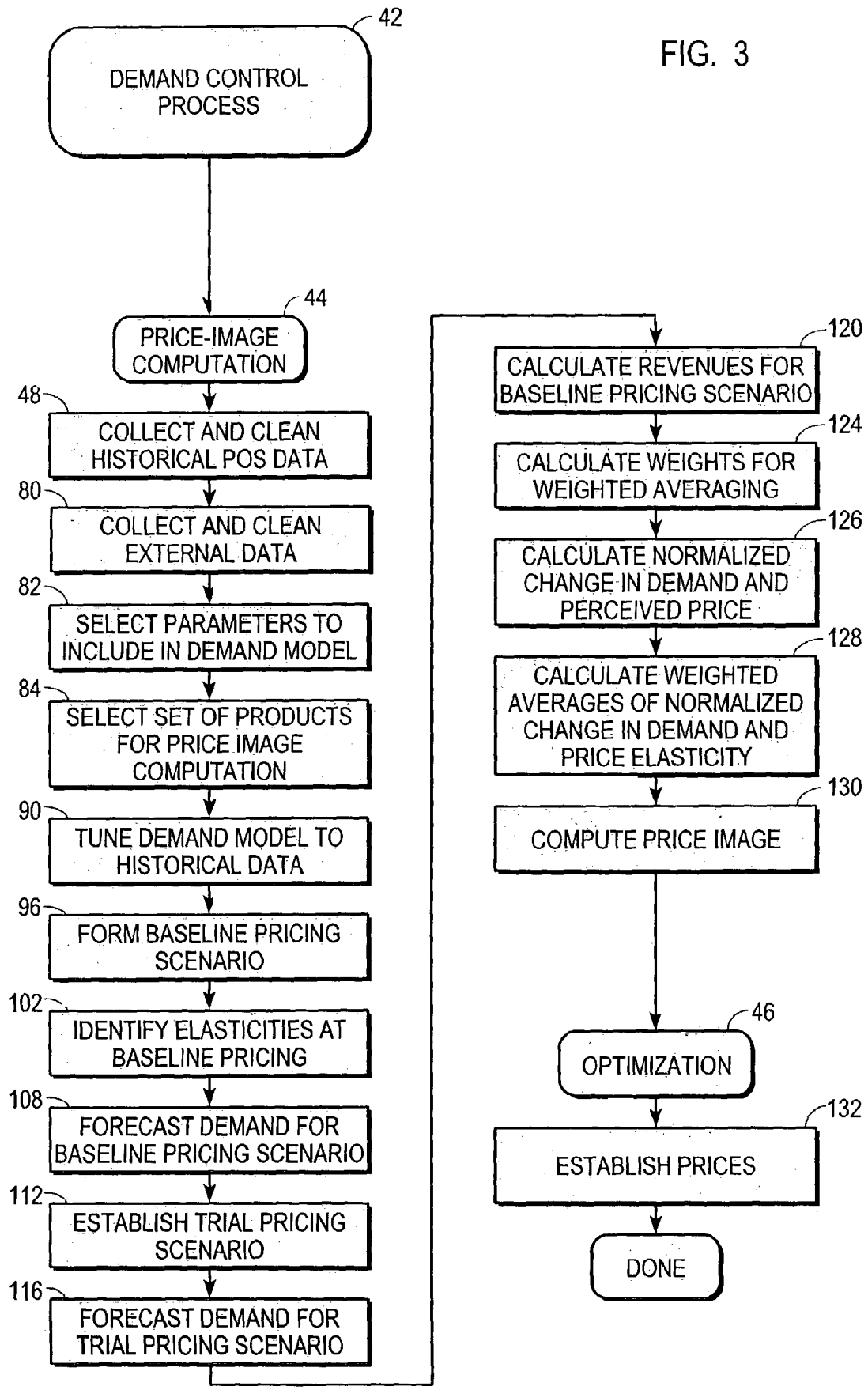
FIG. 3 shows a flow chart of a demand control process that includes a price-image computation subprocess.

FIG. 3 shows a flow chart of a demand control process 42 that includes a price-image computation subprocess 44. Process 42 is carried out, at least in part, within computing environment 10 (FIG. 1) by computer programs 22 and 24 (FIG. 1). Process 42 is discussed below through a variety of tasks associated with corresponding code segments 28 in a manner well understood by those skilled in the art.

Demand control process 42 first performs a price-image computation subprocess 44 to obtain price image values, then performs an optimization subprocess 46 which uses the price image values in optimizing prices. But those skilled in the art will appreciate that optimization subprocess 46 is an optional part of demand control process 42 and that a price image obtained from subprocess 44 may be used in other ways than to optimize prices. For example, merely understanding price image better may be useful to a manager of an enterprise.

Price-image computation subprocess 44 performs a task 48 to collect and clean historical point-of-sale (POS) data for the enterprise. The data may be collected and cleaned in data section 20 of computing environment 10 (FIG. 1). The data may be cleaned by normalizing, compensating for or identifying bad data, and by forming inferences from the data.

Figures 4, 5, 6:
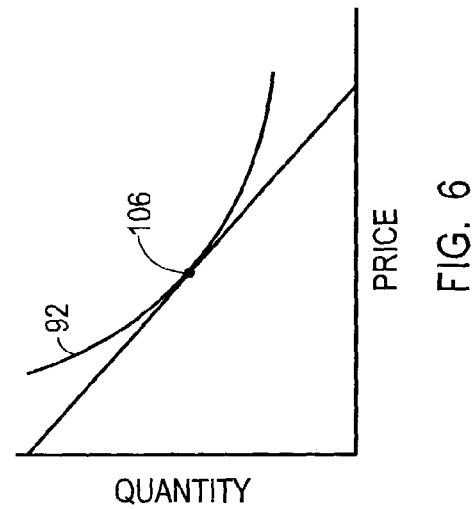
FIG. 4 shows a table of exemplary data items associated with a number of products of an enterprise for which the method of the present invention may be performed.
FIG. 5 shows a table depicting a subset of products selected from the data of FIG. 4.
FIG. 6 shows an exemplary demand curve.

FIG. 4 shows a table 50 of an exemplary list of parameters associated with a number of products of the enterprise that may be collected and cleaned in task 48. In table 50, each product is given a unique product identification (ID) code 52. As discussed above, products are broadly defined herein so that the same goods and/or services when offered in different market segments may be considered different products. Thus, each product ID applies to a particular good and/or service as provided to a particular market segment. The different rows in table 50 summarize the historical data for different products.

A particular good and/or service may be specifically identified by a unique stock keeping unit (SKU) or other similar identifier 54.

Market segments may be differentiated in a variety of ways. For example, different stores 56 may serve different market segments; and, even within a given store different types of customers may reflect different market segments, as captured by a customer type parameter 58. In one example, one type of customer may present "club cards" at check-out time while another customer type may not. A timing column 60 reflects another way that market segments may be differentiated. Timing column 60 reflects the aggregation of data collected and cleaned from date-and-time stamps recorded with POS transactions. Transactions occurring in different times of the day may be considered to be different products, and transactions occurring in different seasons may be considered to be different products.

An aggregate product availability parameter 62 may be provided either directly or inferred from the historical data. Product availability parameter 62 indicates the degree to which a product was available to be transferred to customers in transactions within the specified-market segments. Product unavailability may be inferred, if necessary, by noting abnormal periods of no or low sales in the historical data.

A promotional activity parameter 64 may be provided directly or inferred from the historical data. Promotional (PROMO) activity parameter 64 indicates the degree to which the product is visible, in relation to other products, through the use of various promotional activities. U.S. Pat. No. 6,094,641, which is assigned to the assignee hereof, is entitled "Method For Incorporating Psychological Effects Into Demand Models," and is incorporated by reference herein, teaches some suitable techniques for obtaining promotional activity parameters.

Likewise, a psychological price threshold parameter 66 represents another quantized psychological effect that may be obtained either directly or inferred from the historical data. In one embodiment of the present invention, psychological price threshold parameter 66 provides an adjustment factor that can be applied to an actual price parameter 68 to compensate for the price thresholding phenomenon. Price thresholding reflects the pricing phenomenon wherein customers tend to perceive prices barely less than a "threshold" as being significantly lower than the threshold. For example, customers on average psychologically perceive an item priced at $1.99 as being more than one-cent less than the $2.00 threshold that it actually is, particularly when the item is aggregated with others. The above-discussed U.S. Pat. No. 6,094,641, describes suitable techniques for obtaining psychological price threshold parameter 66 and incorporating it into a demand model.

Unit sales numbers 70 are typically derived directly from POS numbers, and cost numbers 72 can typically be obtained from other routine enterprise accounting records. Unit sales numbers 70 identify the quantity of goods and/or services delivered in the specified market segment, and cost numbers 72 identify the cost to the enterprise of the goods and other factors incurred in making those sales. As indicated by an "other" column 74, a variety of other parameters may be collected from the historical data and used herein.

A demand model, discussed below, is responsive to both price and non-price demand parameters 76 and 78, respectively. Actual price 68, which has a strong influence on demand, is the only price demand parameter 76 depicted in FIG. 4. A seasonality parameter derived from timing data 60, product availability parameter 62, promotional activity parameter 64, customer type parameter 58, and psychological price threshold parameter 66, all represent non-price demand parameters 78. Even though psychological price threshold parameter 66 may be derived from actual price 68, it is not a price demand parameter because it quantizes a psychological, non-price influence on demand.

Referring back to FIG. 3, after or in conjunction with task 48, a task 80 collects and cleans any external data that may be desired for use in the demand model. External data may, for example, include macroeconomic data available from governmental or industry sources.

Following tasks 48 and 80, a task 82 selects or identifies a demand model and the parameters to include in the demand model. Different demand models will have different input parameter requirements, and the selection of parameters in task 82 will define the demand model to use in modeling the historical data. Advisedly, actual price parameter 68 (FIG. 4) will be included in the selection of task 82. In the preferred embodiments of the present invention, at least one non-price demand parameter 78 (FIG. 4) is also included so that a price image calculated based upon demand model factors tuned to describe the historical data more accurately reflects customer perceptions.

In addition, a task 84 selects a set 86 of products over which a price image is to be computed. FIG. 5 shows a table 88 depicting an exemplary set 86 of products selected from table 50 (FIG. 4). FIG. 5 indicates that M products have been selected in this example and given index numbers 1 through M in association with their product ID's 52 from table 50. The selection of task 82 may encompass the entire population of products for the enterprise or any meaningful subset thereof. For example, a manager for an entire enterprise may very well select the entire population of products for calculation of a price image, while a manager of a specific store may select only those products associated with the manager's store.

FIG. 5 also depicts price demand parameters 76 and non-price demand parameters 78 in association with the products of set 86, carried in from table 50 (FIG. 4). Non-price demand parameters 78 reflect, for each product in set 86, the non-price demand parameters selected above in task 82.

Referring back to FIG. 3, after task 84 a task 90 tunes the demand model specified by the selection of task 82 to the historical data by maximizing a likelihood function, and may use Chi-squared and/or other curve-fitting techniques well known to those skilled in the art.

In general, a demand model gives the predicted sales or "demand" for a product based upon its price and other price-related and non-price factors. Consumer demand models are known in the art, and any of such demand models or other models derived for a specific application may be used in connection with the present invention. For the sake of clarity, a simple example of a demand model form is given below in equation 2 to demonstrate demand parameters and corresponding demand factors, but it should be understood that a more accurate demand model may potentially be configured as a set of coupled, multidimensional, nonlinear and discontinuous equations.

$$US = Q_0 e^{-(f_P PP + f_1 NPP_1 + f_2 NPP_2 + \ldots + f_N NPP_N)}, \quad (2)$$

where US is demand expressed as the quantity of unit sales, and $Q_0$ is a constant demand parameter. The argument of e is a utility function with a series of components, where each component includes a demand parameter (PP, $NPP_1$, $NPP_2$, ..., $NPP_N$) modified by a demand factor ($f_P$, $f_1$, $f_2$, ..., $f_N$). The PP demand parameter represents price demand parameter 76, and the NPP demand parameters represent non-price demand parameters 78. Without specification of the demand factors ($f_P$, $f_1$, $f_2$, ..., $f_N$), the demand model is a merely a general purpose equation with the potential of describing any set of data.

FIG. 6 shows an exemplary demand curve 92, which demonstrates the law of downward-sloping demand. Those skilled in the art will appreciate that for each product in set 86 (FIG. 5) task 90 finds the best demand curve that fits the historical data. The demand curve is defined by identifying the demand factors ($f_P$, $f_1$, $f_2$, ..., $f_N$). Of course, different demand curves 92 will be determined for different products, and those different demand curves 92 will have different shapes and positions within the Quantity-Price space depicted in FIG. 6. But all demand curves 92 should nevertheless follow the downward sloping rule.

Figures 7, 8, 9:
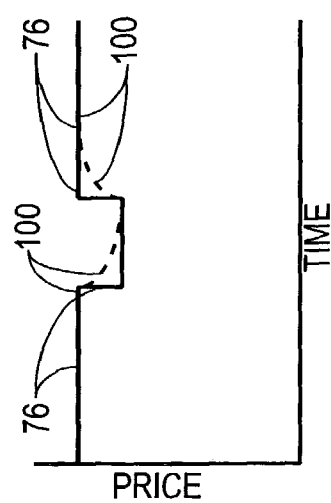
FIG. 7 shows a table depicting a first set of parameters calculated for the subset of products identified in FIG. 5.
FIG. 8 shows a graph depicting how a reference price parameter may be calculated to be a time-dependent function of price.
FIG. 9 shows a table depicting a second set of parameters calculated for the subset of products identified in FIG. 5.

FIG. 7 shows a table 94 depicting a first set of parameters calculated for the set 86 of products identified in FIG. 5. FIG. 7 also carries the product ID 52, price demand parameters 76 and non-price demand parameters 78 from table 88 of FIG. 5. Referring to FIGS. 3 and 7, after or in conjunction with task 90, a task 96 forms a baseline pricing scenario 98. In general, baseline pricing scenario 98 identifies a mix of prices for the products of set 86 that customers expect to pay. In one embodiment, baseline pricing scenario 98 is derived predominantly from actual prices 68. But in another embodiment, baseline pricing scenario 98 is derived predominantly from perceived prices. Perceived prices are actual prices modified by non-price demand parameters 78, such as psychological price threshold parameter 66, in the manner taught in the above-discussed U.S. Pat. No. 6,094,641.

In either embodiment, baseline pricing scenario 98 is responsive predominantly to the historical data for the enterprise rather than upon industry-wide or market survey data. By being predominantly responsive to the historical data for the enterprise, small pockets of external data may be incorporated in baseline pricing scenario 98 if such information is readily available. Desirable results may be obtained even if greater than fifty percent of the weight of the prices in the baseline pricing scenario 98 is determined exclusively from the enterprise's historical data.

FIG. 8 shows a graph depicting how a reference price parameter 100 may be calculated to be a time-dependent function of price. Reference price parameter, 100 is a particularly desirable form of a baseline price that achieves improved accuracy in modeling the prices that customers expect to pay for the products of set 86. FIG. 8 illustrates an example situation where the historical data for the enterprise shows that the price of a product is reduced for a period of time, then returned to its original price. Such situations are common in the historical data because they result from placing products on sale.

For the purposes of the present discussion, the price in question may be either an actual price or a perceived price. FIG. 8 shows that the reference price for the product should track the actual or perceived price when that price is stable, but should differ from the price reflected in the historical data in response to historical price changes. Thus, the reference price reflects the tendency of a customer to expect a product's price to be about what it was at some point in the past rather than what it is now.

In one embodiment, the reference price form of a baseline price may be calculated as follows. A weighting parameter $W_t$ is selected. The weighting parameter $W_t$ changes over time in a manner that indicates the relative importance of pricing in two time periods. In the preferred embodiments, unit sales US, or predicted unit sales, either local or of an industry average, calculated from a model or obtained from other sources, serves as an acceptable weighting parameter $W_t$. Thus, $W_t = US_t$, where the t subscript indicates a specified time period. The unit sales weighting parameter shifts influence in calculating reference price to the time period for which greater unit sales occur. In addition, a depreciation constant h is calculated based upon the difference in time ($\Delta t$) from a time period (t−1) to a subsequent time period (t) and a time constant ($\tau$). Depreciation constant h may, for example, be calculated as: $h=\exp(-\Delta t/\tau)$.

With a weighting parameter $W_t$ and a depreciation constant selected, then an integrated weight (IW) may be calculated by depreciating old data by h, as follows: $IW_t=IW_{t-1}h+W_t$. In addition, a weighting constant $w_t$ for a previous reference price may be calculated as $w_t=1-W_t/IW_t$. Reference price may then be calculated as follows:

$$r_t = w_t r_{t-1} + (1-w_t)p_t \quad (3)$$

where, $r_t$=reference price for time period t,
$r_{t-1}$=reference price for time period t−1, and
$p_t$=price for time period t, either for a local enterprise or an industry average.

Referring now to FIGS. 3, 6, and 7, after or in conjunction with tasks 90 and 96 a task 102 identifies price elasticities of demand 104 (hereinafter price elasticity) for each product in set 86. Those skilled in the art will appreciate that each price associated with each product is characterized by its own price elasticity 104. Thus, a specific price elasticity 104 is associated with point 106, for example, on demand curve 92 at the baseline price for each product in set 82. The price elasticity 104 may be obtained from the demand model which may have been tuned to historical data by the operation of task 90.

After task 102, a task 108 optionally operates the demand model by supplying the baseline price 98 for each product in set 86 to forecast the demand at that baseline price 98. This demand is identified as baseline demand 110 in table 94. Baseline demand 110 is expressed as a quantity (e.g., unit sales) of the product expected to be sold at baseline price 98. When the demand model is tuned to both price and non-price parameters 76 and 78, baseline demand 110 is responsive to non-price parameters as well as baseline price 98.

FIG. 9 shows a table depicting a second set of parameters calculated for set 86 of products identified in FIG. 5. FIG. 9 also carries the product ID 52 from FIG. 5. Referring to FIGS. 3, 7, and 9, price-image computation process 44 includes a task 112 to establish a trial pricing scenario 114. Trial pricing scenario 114 presents a different mix of prices for set 86 of products than was presented in baseline scenario 98. In other words, at least some trial prices 114 for selected ones of the products in set 86 differ from the corresponding baseline prices 98.

FIGS. 7 and 9 show an example situation where product ID "3" had an actual price of $2.29, a baseline price of $2.15, and a trial price of $1.99. The trial price 114 differs from the baseline price 98, which also differs from the actual price 76. But nothing requires all trial prices 114 to differ from corresponding baseline prices 98. FIGS. 7 and 9 also show an example situation where product ID "10,544" had an actual price of $2.29, a baseline price 98 of $3.435, and a trial price 114 of $3.435. In general, trial prices 114 are simply hypothetical prices that a manager may wish to establish for the products of set 86. Referring to FIG. 2, baseline prices 98 may result in pricing scenario 32', while the goal of trial prices 114 will be to describe a more desirable pricing scenario such as one of scenarios 32".

Referring to FIGS. 3, 7, and 9, after task 112, a task 116 operates the demand model using trial prices 114 to generate trial demands 118. Task 116 is similar to task 108 discussed above except that task 116 operates on trial prices 114 rather than baseline prices 98.

Following the forecast of baseline demands 110, a task 120 now calculates revenues 122 for baseline pricing scenario 98. Revenues 122 for each product in set 86 are calculated to be responsive to baseline demand 110 and baseline price 98 in a manner well understood by those skilled in the art (e.g., Revenue=$r_x$*US($r_x$), where $r_x$ is a baseline or reference price for product x, and US($r_x$) is a demand forecast by the demand model at price r for product x). Either a gross revenue may be calculated as shown above, or a net revenue may be calculated by making revenues further responsive to cost 72 (FIG. 4). Accordingly, revenues 122 are calculated to be responsive to price and non-price parameters 76 and 78 because they are based on the demand model forecasts, and the demand model is desirably tuned to price and non-price parameters 76 and 78 in the historical data.

Following task 120, price-image calculation process 44 now forms summary statistics over the entire set 86 for use in calculating a combined price image for set 86. In the preferred embodiment, weighted averaging is used so that more significant products in set 86 provide a greater contribution to the summary statistics. In one preferred embodiment, forecast revenue 122 is used to indicate which of the products in set 86 are more significant. Thus, after task 120 a task 124 calculates weights 125 for use in weighted averaging calculations. Generally, each weight 125 is the revenue 122 for a single product divided by the sum of all revenues 122 in set 86.

The use of revenues 122 in weighting the contributions of each product in set 86 is particularly desirable because it causes a weighted average to dynamically respond to changes in forecast demand. In other words, if some price or non-price parameter 76 or 78 causes a dramatic change in demand for a product between baseline and trial scenarios, then the importance of that change is dynamically reflected in the weighting 125 to be applied to that product's contribution. As one example, when a seasonal product comes into season, not only does its demand increase in response to the non-price seasonality parameter, but its importance to the overall mix of products in set 86 also increases to the extent that the percent of total revenues from the seasonal product likewise increases.

In further preparation for calculating summary statistics over set 86, a task 126 calculates a normalized change in demand 127 between the baseline and trial demands 110 and 118. The normalized change in demand 127 may be calculated for each product in set 86 as follows:

$$\%\Delta US_{i,t} = \frac{US_{i,t}(p) - US_{i,t}(r)}{US_{i,t}(r)}, \quad (4)$$

where the subscripts i,t refer to a product i at time t, $US_{i,t}(p)$ refers to a trial demand 118 at trial price 114, and $US_{i,t}(r)$ refers to a baseline or reference demand 110 at a baseline or reference price 98 or 100 (FIG. 8).

Next, a task 128 calculates weighted averages of normalized change in demand 127 and price elasticity 104 using the weights 125. A weighted average of normalized change in demand 127 may be calculated as follows:

$$\langle \%\Delta US \rangle = \frac{\sum_{i,t} w_{i,t} \%\Delta US_{i,t}}{\sum_{i,t} w_{i,t}}, \quad (5)$$

where the $w_{i,t}$ terms characterize the weight 125 calculated for product i at time t. Likewise, a weighted average of price elasticity may be calculated as follows:

$$\langle \varepsilon \rangle = \frac{\sum_{i,t} w_{i,t} \varepsilon_{i,t}}{\sum_{i,t} w_{i,t}}, \quad (6)$$

where $\varepsilon_{i,t}$ is the price elasticity 104 for the product i at time t.

Following task 128, a task 130 calculates price image. One preferred technique for calculating price image may be as follows:

$$PI = \frac{1}{\langle \varepsilon \rangle} \langle \%\Delta US \rangle. \quad (7)$$

Thus, price image is calculated in response to the change in demand forecast by operation of a demand model that models both price and non-price demand parameters 76 and 78. Since non-price parameters have been modeled, a more accurate price image result is obtained than is possible using a mere price index or another technique that fails to account for the non-price factors which contribute to a customer's perceptions about price.

It should be noted that while the above-presented equation (6) presents a desirable price image formulation, other formulations may also be derived that rely upon the operation of a demand model tuned to both price and non-price demand parameters. For example, another formulation of price image may be set forth as:

$$PI = \sum_{x=1}^{M} w_x (US[p_0] - US[p_1]), \quad (8)$$

where $US[p_z]$ represents a demand forecast by the demand model which has been tuned to both price and non-price parameters 76 and 78 at a price $p_z$. Specifically, price $p_z=p_0$ may represent cost 72, baseline price 98, actual price 76, or even zero. Price $p_z=p_1$ desirably represents trial price 114.

Other formulations may be set forth as:

$$PI = \frac{\sum_{x=1}^{M} w_x \varepsilon_x \frac{\overline{p}_x}{p_x}}{\sum_{x=1}^{M} w_x \varepsilon_x}, \quad (9)$$

$$PI = \frac{\sum_{x=1}^{M} w_x \varepsilon_x p_x}{\sum_{x=1}^{M} w_x \varepsilon_x r_x}, \quad (10)$$

$$PI = \frac{\sum_{x=1}^{M} w_x \varepsilon_x p_x}{\sum_{x=1}^{M} w_x \varepsilon_x}, \text{ and} \quad (11)$$

$$PI = \frac{\sum_{x=1}^{M} w_x \frac{r_x}{p_x}}{\sum_{x=1}^{M} w_x} \quad (12)$$

and still other formulations may be defined by the user.

Following calculation of a price image in task 130, the price-image computation subprocess 44 portion of demand control process 42 is complete. The price image PI may then be reported to and used by optimization subprocess 46 to establish a desirable trial pricing scenario 32" which reflects operation on optimal pricing envelope 30 (FIG. 2). But those skilled in the art will appreciate that it may also be desirable to report and use the price image PI for other purposes without running optimization subprocess 46. Furthermore, one may repeat some or all of price image computation subprocess 44 as desired to adjust the price image computation. For example, one may return to task 112 and calculate a different price image resulting from a different trial pricing scenario.

Optimization subprocess 46 may be carried out in accordance with the teaching of the above-discussed U.S. Pat. Nos. 6,308,162 or 6,094,641 or in any other manner known to or devised by those skilled in the art. Although not specifically indicated in FIG. 3, nothing prevents optimization subprocess 46 from repeating price-image computation process 44, or portions thereof, as needed to resolve an optimum pricing scenario 32".

Those skilled in the art will appreciate that since price image values may be used in optimization subprocess 46, the absolute values for price image are of less importance than the relative values. In other words, optimization subprocess 46 is typically concerned with increases or decreases in price image between trial pricing scenarios rather than specific absolute price image values. For this reason, a wide range of absolute price image values may suffice for the purposes of optimization process 46, so long as greater values consistently and accurately reflect greater price image and lesser values consistently and accurately reflect lesser price image.

Following optimization subprocess 46, a task 132 may be performed to establish actual prices for the enterprise that reflect the optimized prices obtained by optimization subprocess 46 in response to the price image determined above in price-image computation subprocess 44. To the extent that the demand model and optimization process 42 accurately reflect the operational parameters of the enterprise, the results of task 132 should be reflected in a desired change in profit and/or price image as indicated in FIG. 2.

In summary, the present invention provides an improved price image calculation method and computer program. The price image calculations are based on forecasts from a demand model which is tuned to price and non-price input parameters. As a result, market surveys need not be performed and costs are reduced. Moreover, a more accurate price image value and optimization process based on price image result because non-price demand parameters are accounted for in the price image value.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the tasks depicted in FIG. 3 may be partitioned and sequenced in a wide variety of ways other than those specifically described here.

What is claimed is:

1. A method of operating a computing environment to compute a price image for a set of products of an enterprise to be executed by a processor section, said method comprising:

processing, through the execution of a first code segment by said processing section in said computing environment, historical data describing activity of said enterprise to identify price and non-price factors of a demand model to tune said demand model to said historical data so that said demand model is configured to forecast demand from price and non-price input parameters;

calculating, through the execution of a second code segment by said processing section in said computing environment, weighting factors for each product in said set of products, said weighting factors being based upon at least a portion of said price and non-price factors identified in said processing activity; and computing, through the execution of a third code segment by said processing section in said computing environment, said price image for said set of products to be responsive to said weighting factors.

2. A method as claimed in claim 1 additionally comprising:

operating said demand model through the execution of a fourth code segment by said processing section in said computing environment to forecast demand for each product in a set of products, said forecast demand being based upon said price and non-price factors identified in said processing activity.

3. A method as claimed in claim 2 wherein:

said processing activity determines reference prices from said historical data, said reference prices indicating prices that customers expect to pay; and said calculating activity is configured so that said weighting factors are calculated based upon demand forecast at prices substantially equal to said reference prices.

4. A method as claimed in claim 2 wherein said processing activity calculates said reference prices to be predominantly responsive to said historical data.

5. A method as claimed in claim 2 wherein:

a portion of said historical data is historical pricing data; and said processing activity calculates said reference prices as being different from actual historical prices in response to historical price changes.

6. A method as claimed in claim 2 wherein:

said computing activity calculates said price image to be responsive to differences in demand between said demand forecast for a trial pricing scenario and said demand forecast for a baseline pricing scenario.

7. A method as claimed in claim 6 wherein:

said demand is expressed as unit sales;

in said trial pricing scenario, at least some prices for selected ones of said products differ from corresponding prices in said baseline pricing scenario;

said differences in demand are configured as normalized changes in unit sales for each of said products between said baseline and trial pricing scenarios; and said price image computing activity computes an average normalized change in unit sales over said set of products so that said price image is responsive to said average normalized change in unit sales.

8. A method as claimed in claim 1 wherein:

said processing activity comprises identifying price elasticities of demand for said set of products; and said price image computing activity computes said price image to be responsive to said price elasticities of demand.

9. A method as claimed in claim 8 wherein:

said price image computing activity determines a weighted average price elasticity of demand over said set of products from said price elasticities of demand; and said price image computing activity computes said price image to be responsive to said weighted average price elasticity of demand.

10. A method as claimed in claim 1 wherein said non-price demand factors and non-price input parameters characterize promotional activity so that said price image is responsive to said promotional activity.

11. A method as claimed in claim 1 wherein said non-price demand factors and non-price input parameters characterize product availability so that said price image is responsive to said product availability.

12. A method as claimed in claim 1 wherein said non-price demand factors and non-price input parameters characterize seasonality effects so that said price image is responsive to said seasonality effects.

13. A method as claimed in claim 1 wherein said non-price demand factors and non-price input parameters characterize customer types so that said price image is responsive to said customer types.

14. A method as claimed in claim 1 wherein said non-price demand factors and non-price input parameters characterize psychological price thresholds so that said price image is responsive to said price thresholds.

15. A method as claimed in claim 1 wherein said weighting factors are influenced by revenue for each of said products substantially in proportion to a total revenue for said set of products.

16. A method as claimed in claim 1 additionally comprising processing, through the execution of said first code segment by said processing section in said computing environment, historical data describing activity of said enterprise to identify factor values associated with price and non-price demand parameters of said demand model to tune said demand model to said historical data.

17. A method as claimed in claim 1 wherein:

said method additionally comprises operating said demand model through the execution of a fourth code segment by said processing section in said computing environment to forecast demand based upon said price and non-price input parameters; and said computing activity computes said price image to be responsive to change in demand for said set of products.

18. A method of utilizing a computing environment to control demand for products offered by an enterprise through the use of price image to be executed by a processing section, said method comprising:

processing, through the execution of a first code segment by said processing section in said computing environment, historical data describing activity of said enterprise to identify factors of a demand model that cause said demand model to forecast demand from price and non-price input parameters;

calculating, through the execution of a second code segment by said processing section in said computing environment, a price image to be responsive to said demand model factors identified in said processing activity; and reporting said price image at an input/output section of said computing environment.

19. A method as claimed in claim 18 wherein said processing activity calculates reference prices from said historical data, said reference prices characterizing prices that customers expect to pay.

20. A method as claimed in claim 18 wherein:
a portion of said historical data is actual historical pricing data; and
said processing activity calculates said reference prices as being different from actual historical prices in response to historical price changes.

21. A method as claimed in claim 19 wherein said processing activity step calculates said reference prices to be predominantly responsive to said historical data.

22. A method as claimed in claim 18 wherein:
said processing activity identifies a price elasticity of demand for each of said products; and
said calculating activity calculates said price image to be responsive to said price elasticities of demand.

23. A method as claimed in claim 22 wherein:
said calculating activity determines a weighted average price elasticity of demand over said products from said price elasticities of demand; and
said calculating activity calculates said price image to be responsive to said weighted average price elasticity of demand.

24. A method as claimed in claim 23 wherein:
said method additionally comprises calculating, through the execution of a third code segment by said processing section in said computing environment, revenues for each of said products; and
said weighted average price elasticity of demand is influenced by said price elasticity of demand for each of said products in proportion to revenues for each of said products.

25. A method as claimed in claim 18 wherein:
said method additionally comprises establishing, through the execution of a third code segment by said processing section in said computing environment, a trial pricing scenario for said products in which at least some prices for selected ones of said products differ from corresponding prices for said selected products in a baseline pricing scenario;
said method additionally comprises determining, through the execution of a fourth code segment by said processing section in said computing environment, a normalized change in demand between said trial and baseline pricing scenarios in response to operation of said demand model; and
said calculating activity calculates an average normalized change in demand over said products so that said price image is responsive to said average normalized change in demand.

26. A method as claimed in claim 25 wherein:
said processing activity identifies price elasticities of demand of said products; and
said calculating activity calculates an average price elasticity of demand over said products and calculates said price image to be responsive to said average price elasticity of demand in combination with said average normalized change in demand.

27. A method as claimed in claim 25 wherein said average normalized change in demand is a weighted average.

28. A method as claimed in claim 27 wherein:
said method additionally comprises operating, through the execution of a fifth code segment by said processing section in said computing environment, said demand model to forecast demand;
said method additionally comprises calculating, through the execution of a sixth code segment by said processing section in said computing environment, revenues for each of said products in response to said forecast demand; and
said weighted average of said average normalized change in demand is influenced by said forecast normalized change in demand for each of said products in proportion to revenues for each of said products.

29. A method as claimed in claim 27 wherein said weighted average dynamically responds to changes in forecast normalized change in demand for each of said products by said demand model.

30. A method as claimed in claim 18 additionally comprising establishing prices for said products in response to said price image reported in said reporting activity.

31. A method as claimed in claim 18 additionally comprising promoting said products in response to said price image reported in said reporting activity.

32. A computer program residing upon a computer-readable medium and executable by a processor, said computer program configured to compute a price image for a set of products of an enterprise, said computer program comprising:
a first code segment that processes price and non-price historical data describing activity of said enterprise to tune factors for a demand model;
a second code segment that identifies price elasticities of demand for said set of products from said demand model;
a third code segment that causes said demand model to forecast a trial demand for said set of products based upon a trial price scenario for said set of products and to forecast a baseline demand for said set of products based upon a baseline price scenario for said set of products;
a fourth code segment that calculates normalized demand changes for said set of products between said trial and baseline price scenarios; and
a fifth code segment that calculates said price image for said set of products in response said normalized demand changes and in response to said price elasticities of demand.

33. A computer program as claimed in claim 32 additionally comprising:
a sixth code segment that calculates revenues for said set of products in response to one of said baseline and trial demands forecast in response to operation of said third code segment; and
a seventh code segment that calculates weighting factors for each of said products in said set of products, said weighting factors being applied by said fifth code segment in calculating said price image, and said weighting factors being responsive to said revenues.

34. A computer program as claimed in claim 32 additionally comprising a sixth code segment that generates said baseline pricing scenario predominately in response to said historical price data for said enterprise.

* * * * *

UNITED STATES PATENT AND TRADEMARK OFFICE
CERTIFICATE OF CORRECTION

| | | |
|---|---|---|
| PATENT NO. | : 7,603,286 B2 | Page 1 of 1 |
| APPLICATION NO. | : 10/637991 | |
| DATED | : October 13, 2009 | |
| INVENTOR(S) | : Kenneth J. Ouimet | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1832 days.

Signed and Sealed this

Fifth Day of October, 2010

David J. Kappos
*Director of the United States Patent and Trademark Office*